C. R. HARRIS.
EVAPORATING APPARATUS.
APPLICATION FILED AUG. 12, 1916.
1,257,854.
Patented Feb. 26, 1918.
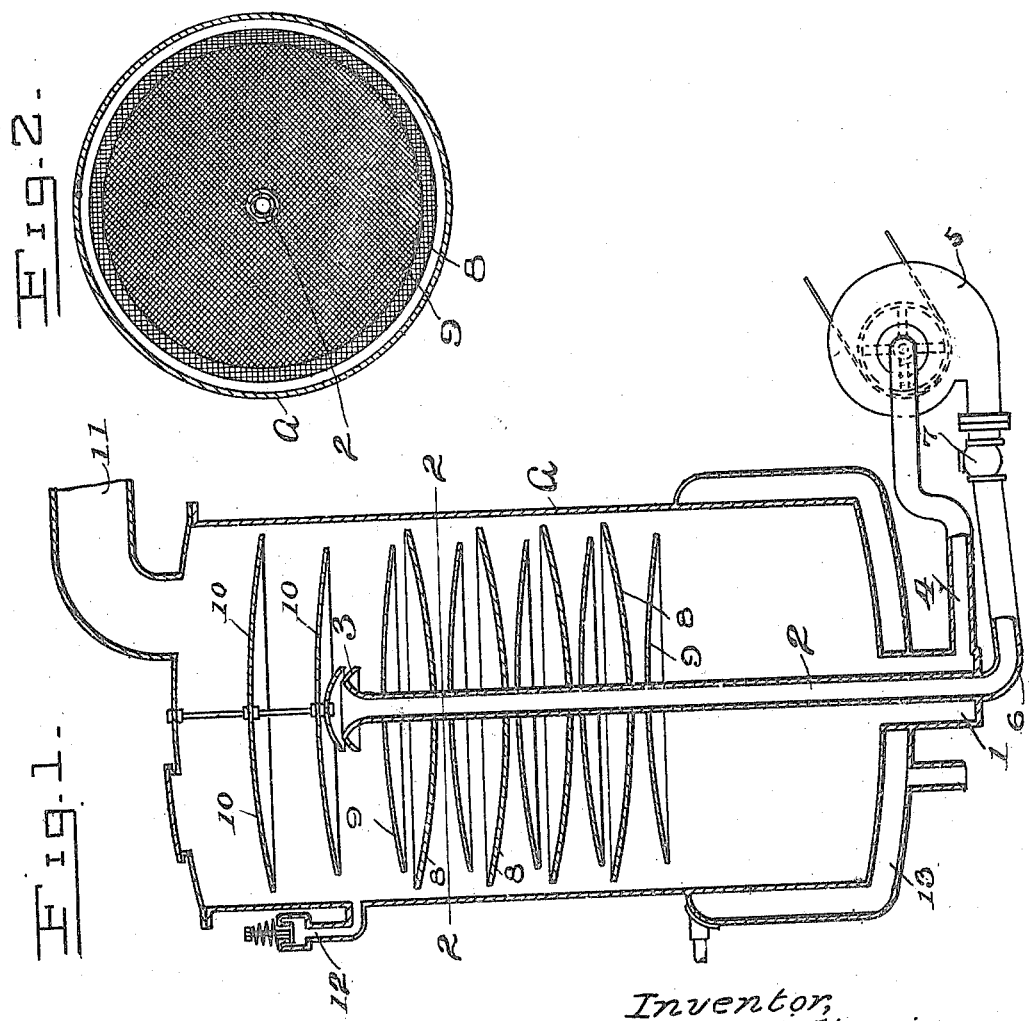
Inventor,
Charles R. Harris.
By Vernon E. Hodges
His Attorney.

UNITED STATES PATENT OFFICE.

CHARLES R. HARRIS, OF LOS ANGELES, CALIFORNIA, ASSIGNOR OF NINE-TENTHS TO ALBERT P. CAMPBELL, OF LOS ANGELES, CALIFORNIA.

EVAPORATING APPARATUS.

1,257,854.   Specification of Letters Patent.   Patented Feb. 26, 1918.

Application filed August 12, 1916. Serial No. 114,618.

*To all whom it may concern:*

Be it known that I, CHARLES R. HARRIS, a citizen of the United States of America, residing at Los Angeles, in the county of Los Angeles and State of California, have invented certain new and useful Improvements in Evaporating Apparatus, of which the following is a specification.

My invention relates to an evaporating apparatus and appertains to that type of an apparatus for dealcoholizing, condensing, evaporating, or distilling liquids such as beer, ale, stout, wine, malt extracts and the like.

The object of the invention is to provide an improved evaporating apparatus arranged to facilitate the evaporation of a liquid or semi-liquid by passing the liquid in a warm or heated state down over a plurality of diaphragms thereby exposing as large a quantity as possible to the air in order that the fumes or separated elements may be drawn off by a partial vacuum as hereinafter more fully described.

Figure 1 is a vertical section of my apparatus;

Fig. 2, is a transverse horizontal section on line 2—2 of Fig. 1.

A, represents the evaporating tank provided at its base with a trap 1. Vertically arranged in the center of the tank A, is a feed pipe 2, provided at its uppermost end with a suitable spray head 3. Connected to the lower end of the trap 1 is a pipe 4, the outer end of which is connected to a force pump 5, which pump in turn communicates through pipe 6 with the lower end of the feed pipe 2; a suitable check valve 7 being interposed between the force pump 5 and feed pipe 2.

Horizontally arranged upon the feed pipe 2 are a plurality of convex and concave diaphragms 8 and 9 of a screen or perforated nature, the latter being of slightly smaller diameter adapted to deliver their contents to the diaphragm, below which is a slightly greater diameter.

In practice the liquid is adapted to be forced up through the feed pipe 2 down over the several diaphragms thereby exposing to the air a thin film of the liquid, thereby allowing the vapor to pass off.

Arranged directly above in the upper part of the evaporating tank is arranged a plurality of convex diaphragms or retarders 10—10, supported from the roof of the evaporating tank A. These diaphragms or retarders are for the purpose of keeping the foam arising from the liquid from passing into the suction pipe 11, connected with the upper part of the evaporating tank A, which pipe is connected with a vacuum pump or other means for producing a partial vacuum in the tank A.

A valve 12 is arranged beside the tank and above the level of the liquid for maintaining the vacuum in the upper part of the tank at a predetermined point.

The liquid contained in the evaporating tank A is adapted to be heated by a water jacket 13 placed around the base of the tank. This method or any other suitable means may be employed for properly heating the contents of the tank.

From the foregoing, it will be seen, I have produced an apparatus of a very simple and effective design and one which will produce the work most efficiently.

I claim:

1. An evaporating apparatus comprising a vessel adapted to contain a liquid to be evaporated, and provided with an inlet tube, an outlet at the base of the vessel, a plurality of concavo-convex diaphragms vertically spaced, retarding disks arranged in the upper portion of the vessel, means supporting said retarding disks, a cap for said inlet tube supported at a point a little above the discharge end of the inlet tube, whereby the liquid is directed upon the diaphragms, and an outlet at the upper part of the vessel for the escape of vapors.

2. An evaporating apparatus comprising a vessel adapted to contain a liquid to be evaporated, and provided with an inlet tube centrally arranged within the vessel, an outlet at the base of the vessel supporting said inlet tube, a plurality of concavo-convex diaphragms spaced upon the inlet tube, retarding disks arranged in the upper portion of the vessel, means supporting said retarding disks from the roof of the vessel, a cap for said inlet tube supported by said retarding disk supporting means, whereby the liquid is directed upon the diaphragms, and an outlet at the upper part of the vessel for the escape of vapors.

3. An evaporating apparatus comprising an evaporating tank adapted to contain a liquid to be evaporated, and provided with an inlet tube centrally arranged within the vessel and extending upwardly from the base, an outlet at the base of said tank surrounding said inlet tube, a plurality of concavo-convex diaphragms vertically spaced upon the inlet tube, a cap supported from the roof of said tank and adapted to cover the upper end of said inlet tube whereby the liquid is directed upon the diaphragms, and an outlet at the upper part of the vessel for the escape of the vapors.

4. An evaporating apparatus, comprising a vessel adapted to contain a liquid to be evaporated, and provided with an inlet and outlet for the liquid, the inlet arranged centrally of the tank and the outlet adapted to surround the same, a plurality of diaphragms arranged upon the inlet between the inlet tube and outlet for agitating the liquid as it passes to the outlet, an outlet arranged at the upper end of the tank for the escape of the vapors, and a plurality of retarding disks arranged in the upper portion of the tank adjacent to the vapor outlet.

In testimony whereof I affix my signature.

CHARLES R. HARRIS.

Copies of this patent may be obtained for five cents each, by addressing the "Commissioner of Patents, Washington, D. C."